April 11, 1950  G. W. SHEREN  2,503,455
FIRE HOSE END STRAINER
Filed March 22, 1946

INVENTOR.
Glenn W. Sheren
BY
Samuel H. Davis

Patented Apr. 11, 1950

2,503,455

UNITED STATES PATENT OFFICE 2,503,455

FIRE HOSE END STRAINER

Glenn W. Sheren, Lansing, Mich., assignor to Glenn W. Sheren, Norman C. Dart, and Lowell Robinson, doing business as Sheren Fire Equipment Company, Mason, Mich.

Application March 22, 1946, Serial No. 656,306

1 Claim. (Cl. 210—170)

This invention relates to strainers and is more particularly concerned with a strainer for use in connection with fire-combating equipment and is most particularly concerned with a strainer for use in connection with equipment which depends on a river, a stream, or a drainage ditch for its source of water supply.

Strainers for use in fire-combating equipment such as mentioned supra, consist generally of a wire mesh or the like, which is immersed in a natural body of water such as a stream, a river, or a drainage ditch, and the water is drawn by suction produced by the pumping equipment. There are disadvantages in the use of strainers such as above-mentioned due to their tendency to become clogged with solid substances commonly present in the water of such sources. Such strainers when immersed in a body of water descend to the bottom thereof and tend to become clogged with the solid substances present near the bottom of the said body of water, and the pumping of the water is for that reason very inefficient. Attempts to prevent such clogging of the strainers have not met with success and resort is had to suspending the strainer, as by holding by a member of the fire-combating crew, for example, to prevent it from descending too near to the bottom of the water supply.

An object of this invention is the provision of a strainer whereby clogging with solid substances, such as above-noted, is prevented.

I have now found that I am able to avoid the disadvantages above-mentioned and am able to accomplish the object set forth and have accordingly discovered and invented a strainer and am readily able to draw water from any natural sources, such as a river, a stream, or a ditch, without the disadvantage involved in the use of strainers presently in use.

Reference will be had to the accompanying drawing in which the various views are shown for clearness of illustration.

Figure 1:
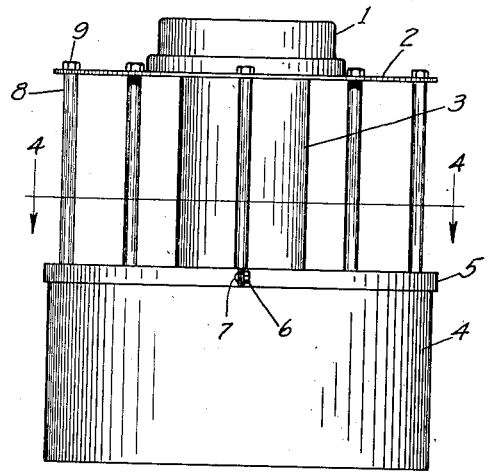
Fig. 1 is a side elevation of my invention.
Figure 3:
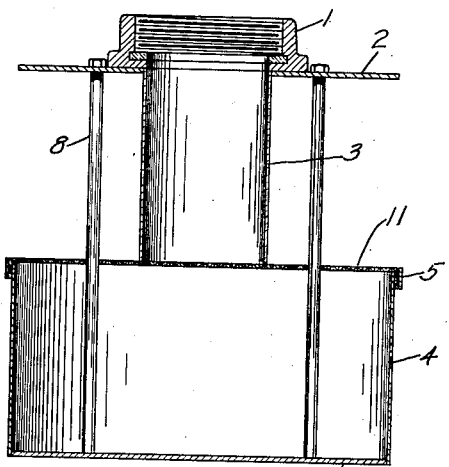
Fig. 3 is a vertical section of my invention taken on line 3—3 of Fig. 2.
Figure 2:
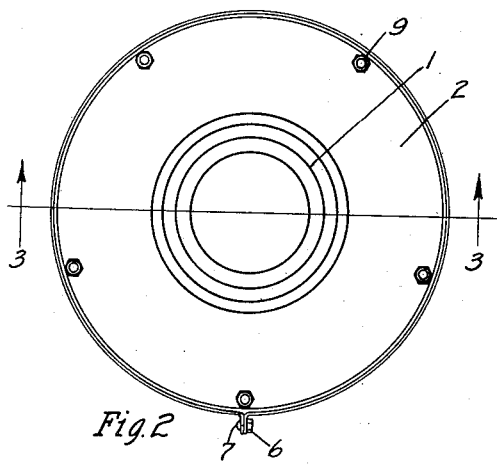
Fig. 2 is a plan or top view of the same.
Figure 5:
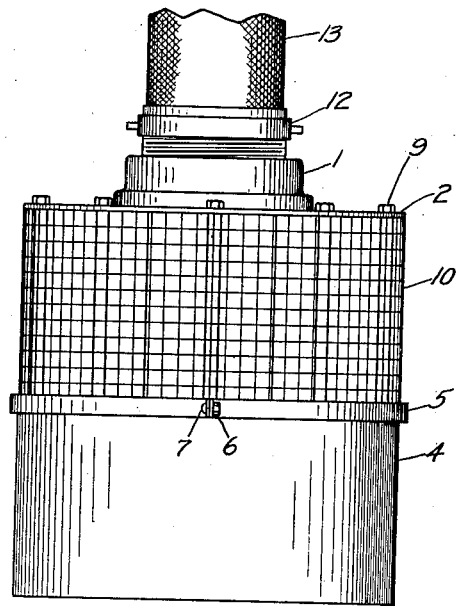
Fig. 5 is a side elevation of a modified form of my invention, showing screen 10 enveloping the upper portion of the strainer of my invention in addition to screen 11 shown in Fig. 4.
Figure 4:
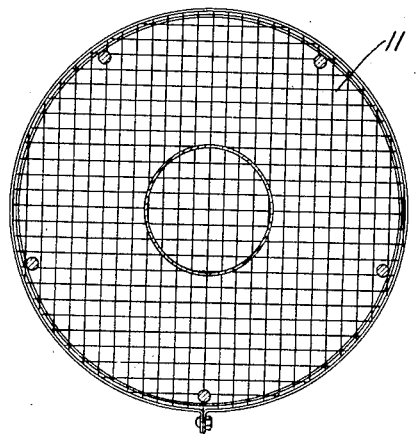
Fig. 4 is a horizontal section taken on line 4—4 of Fig. 1.

In Fig. 5 is shown one type of fire hose connection 12 and a portion of the fire hose 13.

In accordance with the present invention provision is made whereby the screen 10 and the screen 11 is prevented from coming in contact with the bottom of the body of water by the shroud 4 which serves for this purpose whether the strainer is positioned vertically or horizontally in the body of water. The connection 1 is provided with standard fire hose thread and coupling 12 to connect the fire hose 13 to the body of the strainer. The circular plate 2 is provided with holes through which posts 8, threaded at each end, are inserted and serve as supports for the body of the strainer around which the screen 10 is enveloped. The opposite ends of posts 8 are inserted in holes in plate 14 and are secured by threads therein, none of which threads is shown. The tube 3 is open at each end and its lower end is placed in contact with screen 11. The said tube 3 is securely attached to and passes through the circular plate 2 and terminates near the bottom of connection 1. The screen 10 envelops the posts 8 and is held securely by band 5, the ends of which meet and are fastened by bolt 7 and nut 6.

In operation, vacuum is produced in the tube 3 and water enters through screen 11 and through screen 10. I wish to particularly point out that the use of screen 10 is optional and the practice of my invention may be accomplished without the use of the same. Screen 11 is the preferred embodiment of my invention and the satisfactory operation of the strainer of my invention is accomplished by the use of the same. Screen 10 is used when desired, in which instance the water passes through two screens before it enters the tube 3 and passes into the fire hose and into the fire-combating equipment proper.

I wish to particularly point out that the strainer may be used in any position desired, and satisfactory straining of the water is obtained.

While I have shown and described a present preferred embodiment of the invention it is to be distinctly understood that the invention is not limited thereto, but may be otherwise variously embodied within the scope of the following claim.

I claim:

A strainer for fire combating epuipment comprising an upper circular plate, the said upper circular plate having an opening in the center thereof, a plurality of posts, the said posts being threaded at the top end, each of the said posts being inserted into a plurality of holes in the said upper circular plate, each of the said posts being secured thereto the said upper circular plate by means of a nut, a lower circular plate, a plurality of threaded holes therein the said lower circular plate, the said threaded holes provided for securing the said plurality of posts, a tube, a circular horizontal screen, the said tube extending lowerly from the said horizontal screen, the said tube passing through the opening in the center of the said upper circular plate and terminating substantially thereabove the said upper circular plate, a vertical screen, the said vertical screen substantially enveloping the said posts and being held thereto the said posts by means of a band attached lowerly thereto the said vertical screen, a shroud, the said shroud being attached below the vertical screen, the said shroud being held thereto the said vertical screen by means of the lower circular plate and the said band, the said circular horizontal screen extends from the lower edge of the said tube across to the upper edge of the said shroud and closes off the end of the tube and being parallel to the said upper circular plate, and means for connecting the terminating tube of the said strainer to suction means, for sucking water through the said strainer, through the said tube, and through the suction means.

GLENN W. SHEREN.

REFERENCES CITED

The following references are of record in the file of this patent:

UNITED STATES PATENTS

| Number | Name | Date |
|---|---|---|
| 47,011 | Greenleaf | Mar. 28, 1865 |
| 615,847 | Hansen | Dec. 13, 1898 |
| 1,421,440 | Fisher | July 4, 1922 |
| 1,836,269 | McKenzie | Dec. 15, 1931 |
| 1,945,824 | Saxe | Feb. 6, 1934 |
| 2,015,274 | Johnston | Sept. 24, 1935 |
| 2,024,646 | Jones | Dec. 17, 1935 |
| 2,300,952 | May | Nov. 3, 1942 |